MAGNETIC LOGIC SYSTEMS COMPRISING STACKED LAYERS
OF MAGNETIC FILMS WHICH CONTAIN LOW
COERCIVE FORCE CHANNELS

Filed Jan. 22, 1968

INVENTORS.
ROBERT J. SPAIN
HARVEY I. JAUVTIS
BY
John A. Lahive, Jr.
ATTORNEYS 3,461,442

MAGNETIC LOGIC SYSTEMS COMPRISING STACKED LAYERS OF MAGNETIC FILMS WHICH CONTAIN LOW COERCIVE FORCE CHANNELS

Robert J. Spain, Paris, France, and Harvey I. Jauvtis, Belmont, Mass., assignors, by mesne assignments, to Cambridge Memory Systems, Inc., Framingham, Mass., a corporation of Massachusetts Filed Jan. 22, 1968, Ser. No. 699,455
Int. Cl. G11b 5/00
U.S. Cl. 340—174 9 Claims

ABSTRACT OF THE DISCLOSURE

Magnetic logic systems are formed from layers of vertically stacked magnetic films. Each film is anisotropically magnetized and contains low coercive force channels arranged in patterns so that domains of reversed magnetization propagated along channels in one film effect the state of magnetization in channels in the next adjacent film, causing either inhibition of propagation or initiating new domains of reversed magnetization.

BACKGROUND OF THE INVENTION

Field of the invention

This invention relates in general to magnetically operating logic elements and more particularly to logic elements formed by overlying films in which small domains of reversed magnetization are propagated along particular channel configurations.

Prior art

The formation of logical elements and networks from thin anisotropically magnetized films is described in copending U.S. application Ser. No. 520,195, assigned to the assignee of the entire right, title and interest of the present application. In that application a thin ferromagnetic film which is magnetically anisotropic, has low coercive force channels formed in it. Small domains of reversed magnetization are caused to propagate along these channels by means of intermediate magnitude switching fields applied to the film in a direction opposite to the initial magnetization. This mode of magnetization reversal is referred to as domain tip propagation and, at the tip, each of the domains has associated with it a stray magnetic field. By an appropriate pattern of channels, the stray magnetic field from a domain propagated in one channel may be used to inhibit the propagation of a domain in another channel or, acting in concert with some other field, to nucleate a domain in a channel which has none.

In that application, the preferred embodiment is described in terms of a logic plane, in which the interacting channels are positioned adjacent to one another on same plane. Formation of logical networks utilizing this plane approach is subject, however, to some limitations. Thus, where the layout requires that one channel crosses over another, some sort of bridge in another plane is required so that the magnetic domain may propagate across without interacting with the channel over which it is passing. Other factors involve the channel size and the limitations of drive field. Since the channels in the same plane must necessarily be separated by a narrow zone of high coercive force material, the interacting field between the channels is limited to a value substantially less than that at the actual domain tip. Additionally the channels in a plane must be separated in terms of distance because of the necessity of a high coercive force region between them. Yet the field from the domain tip in such an arrangement decreases in proportion to the distance from the center of the tip, so that the interacting field falls off very sharply.

SUMMARY OF THE INVENTION

Broadly speaking the logic elements and network of the present invention are formed of layers of thin ferromagnetic film, magnetically anisotropic with each film having low coercive force channels positioned so that the propagation of a domain of reversed magnetization within the channel in one film effects the state of magnetization within a channel in the adjacent layer. The mode of magnetization propagation employed in these films is referred to as "domain tip propagation." In this mode, a small lenticular shaped domain of reversed magnetization is caused to propagate along the long axis of the lentil by applying to the film an intermediate magnitude switching field in a direction opposite to the initial magnetization direction of the film. Domain tip propagation along low coercive force channels within the magnetically anisotropic film exhibits several properties which are ideally suited for operation of these logic elements. The speed of operation is very high and the direction of propagation of a domain tip depends upon the direction of the applied field. Most important, however, the effective field of interaction between domain tips is relatively large and the net magnetic charge of the domain tip may be either positive or negative depending upon the direction of propagation of the tip with respect to the initial magnetization. The use of narrow channels of low coercive force material in a magnetically anisotropic film assures that the application of the switching field will produce propagation of the domain along the entire channel, rather than lateral wall motion across the entire plane.

Logical networks utilizing the multi-layer magnetic films of this invention, are laid out as a series of main channels and a series of control channels. The state of magnetization of the control channels effect the propagation of reverse domains along the main channels. Basically there are two types of interaction, inhibiting interaction and a nucleating interaction. In the inhibiting interaction the propagation of the domain of reversed magnetization along a main channel is inhibited by the presence of a domain of reversed magnetization in an appropriately positioned control channel with the magnitude and direction of the stray field from the inhibiting channel being sufficient to lower the field in the adjacent main channel below the value necessary to sustain propagation of the domain of reversed magnetization along it. The nucleation interaction involves the creation of a domain of reversed magnetization in a main channel where there previously was none. In this instance the net effect of the applied drive field to the film and stray field from a domain of reversed magnetization in the control channel is to nucleate a small domain of reversed magnetization within the main channel.

The design of these magnetic networks must include consideration of unwanted interactions as well as the achieving of the intended interactions between the channels. Thus, no interaction should take place when a control channel is simply passing over a main channel and, similarly, the combination of the drive field applied to the magnetic film and the stray interaction field associated with a domain in an inhibit control channel must not reach a value such that a new domain may be nucleated in the main channel. In these design areas the use of vertically layered films has been found to produce significant advantages over logic systems in which the interacting channels are in a single plane. Thus the basic relation between control channel and main channel may involve overlap thereby providing for a directionality of field impossible to achieve with a side-by-side channel arrangement. Similarly, the ease of cross overs in conjunction with overlap permits shaping of the control channel or channels to produce defined field geometry not achievable with a single construction. A much wider tolerance of drive fields is acceptable, since the interaction fields between the control and signal channels can be very much larger than in the single plane configuration. This is so because the fields are not separated by a region of high coercive force and because the very close spacing permits the channels to be within relatively high stray field regions.

Generally, it has been found that successful network operation requires the control channel to be significantly wider than the signal channels in the region of interaction. Thus a typical value for signal channels is 1.0 mils wide in a film of 1,500 A. thick iron, nickel and cobalt. The control channel for the same film would typically be from 3 to 6 mils wide.

The drive field tolerance, T, is defined as $$T=\pm\frac{H_{max}-H_{min}}{H_{max}+H_{min}}\%$$

The minimum drive field is the field required to propagate a domain of reversed magnetization along the narrow part of the signal channel and is equal to the tip coercive force $H_t$. The maximum drive field is either H max R, the value of the field which overrides the inhibiting effect of a domain in the control channel of an inhibiting logic element or H max T, the field at which nucleation in the signal channel takes place as the result of a domain tip in an inhibiting channel or cross-over channel. These maximum field values in turn depend upon the intensity of the stray field from a control channel domain tip at the signal channel. If the value of this external field with a separation, between the control and signal channel is designated as $$H_i(s) \text{ then the } H_{max\,R}=H_t+H_i(s)$$

The value of $H_{max\,T}=H_k-H_i(s)$, where $H_k$ is equal to the anisotropy field which is approximately equal to the nucleation field in the signal channel. The true maximum drive field is then obtained when the interchannel separation $s$, is such that $$H_{max\,R}=H_{max\,T}$$

The drive field tolerance can then be expressed as $$T=\frac{H_t+H_i-H_t}{H_t+H_i+H_t}=\frac{H_i}{2H_t+H_i}$$

but since $H_{max\,R}=H_{max\,T}$ then $H_k-H_i=H_t+H_i$ or $$H_i=\frac{H_i-H_t}{2}$$

and $$T=\frac{\frac{H_k-H_t}{2}}{2H_t+\frac{H_k-H_t}{2}}$$

$$=\frac{H_k-H_t}{4H_t+H_k-H_t}$$

$$=\frac{H_k-H_t}{H_k+3H_t}$$

Typical values of the parameters are:

$$H_t=4 \text{ oe. and } H_k=12 \text{ oe.}$$

The theoretical tolerance of the drive field is then ±33% for these values.

Description of preferred embodiments

Figure 1:
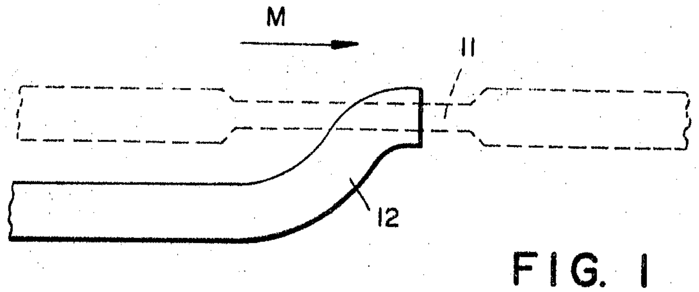
FIG. 1 is an illustration in diagrammatic form of an inhibit gate configuration in accordance with the principles of this invention.

FIG. 1 is an illustration in schematic form of a simplified version of an inhibit gate. In this diagram, as well as in the remainder of the illustrations in diagrammatic form, the channel shown in dotted lines is the low coercive channel in one magnetic film, while the channels shown in solid lines is the low coercive force channel in another film placed in superposition with the first film. Suitable films may be formed of a mixture of 72% nickel, 15% iron and 13% cobalt having a thickness of 1,500 A. The signal channel 11 has a width in the non-interaction areas of approximately 3 mils, but it is narrowed down to approximately 1.0 mils at the area where it is to interact with the inhibiting control channel 12. The control channel, to perform effectively, must have a width of at least 3 mils and may extend to a width of 6 mils. In operation a propagation field is applied by conventional methods to the network including the signal channel 11 and the inhibit channel 12. If there is a domain of reversed magnetization propagated in channel 12, then the domain of reversed magnetization propagating along channel 11 in the direction of the easy axis of magnetization M is inhibited from continued propagation. For the geometry shown in FIG. 1, most films will operate for an applied field between 3½ and 6 oe. With this geometry the drive tolerance, on the average, is somewhat less than the theoretical falling generally between 20 and 30%.

Figure 2:
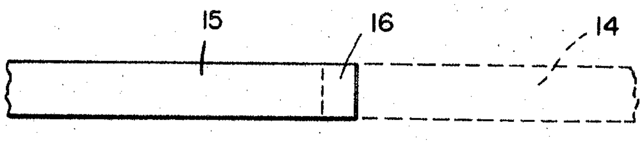
FIG. 2 is an illustration in diagrammatic form of a transfer element in accordance with the principles of this invention.

Logical elements for nucleating a domain in a channel or transferring a domain of reversed magnetization from a control channel to a signal channel require that the transferring channel terminate in the vicinity of the receiving channel and that it must be fairly wide. Under these conditions the interaction field is large, which is what is required to nucleate a new domain. In FIG. 2 there is an illustrated control channel 14 which overlaps a signal channel 15 for purposes of transferring the domain from the control channel to the signal channel. It has been found that where both signal and control channels have a width of 8 mils an overlap region of between 4 and 8 mils is necessary in order to provide for transfer at a sufficiently low drive field that does not exceed the minimum drive field $H_t$ for inhibit gates in the same network.

Figure 3:
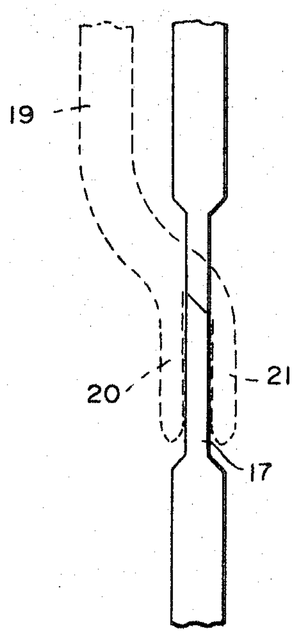
FIG. 3 is an illustration in diagrammatic form of a second embodiment of an inhibit gate constructed in accordance with the principles of this invention.
Figure 4:
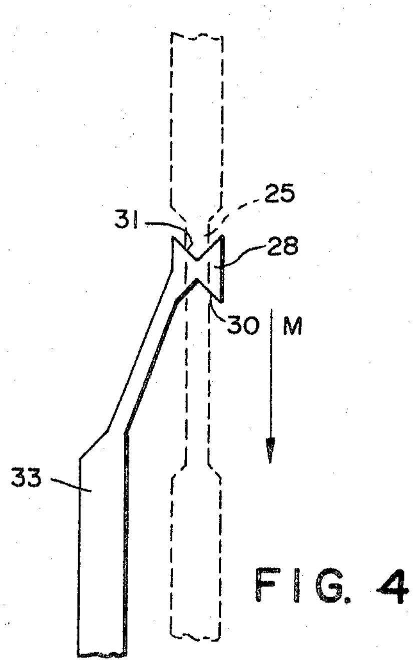
FIG. 4 is an illustration in diagrammatic form of a third embodiment of an inhibit gate constructed in accordance with the principles of this invention.

While the simplified inhibit gate illustrated in FIG. 1 will operate under the conditions stated, it has been found that much more efficient operation of inhibit gates may be obtained with the control channel configurations illustrated in FIGS. 3 and 4. With reference to FIG. 3, a so-called "fork" gate is illustrated in which the control channel 19 is bifurcated into two sections 20 and 21, with section 20 lying on one side of the signal channel 17 and section 21 lying on the other side. With this configuration, much higher drive fields may be applied without unwanted nucleation in the signal channel 17. Drive tolerances of ±40% have been obtained with fork channels where each section of the fork was 2 mils wide, with a separation of 2 mils between the forks and a 1.1 mil wide signal channel. The increase in drive tolerance results from the fact that the pair of sections of the control channel generate fields which combine to form a resultant field along the easy axis, but in which the hard axis components cancel one another out, thereby reducing the field available for nucleation, without adversely affecting the inhibiting field.

The configuration illustrated in FIG. 4 has produced the most efficient gate configuration. The control channel 33 is terminated in an interaction section 28 which generally has the shape of an ax head directly overlying the narrow portion 25 of the signal channel. The interaction section of the control channel 33 has a pair of V shaped edges 30 and 31. The V shaped edge 30 generates an inhibiting field on the signal channel 25 with the highest concentration of the repelling force being between the two V's. As in the case of the fork gate the hard axis components cancel one another, producing therefore a very high inhibit factor with respect to the field necessary to nucleate a new domain within the signal channel. The second V shaped edge 31 of the control channel operates in a similar fashion, tending however to exert an attracting force on the magnetic domain in the channel 25 and thereby inhibiting its propagation. With the configuration shown in FIG. 4, the satisfactory results have been obtained with a 1 mil wide signal channel and with the width of the ax portion being approximately 7 mils and the length of that portion being 10 mils.

While specific configurations of logical elements have been described, other arrangements of two film logic may be employed, provided that the control channel widths are maintained sufficiently wide with respect to the signal channels so that a relatively large tolerance of drive field results.

Having described the invention various modifications and improvements will now appear to those skilled in the art and the invention should be construed as limited only by the spirit and scope of the appended claims.

What is claimed is:

1. A magnetic logic element comprising, a first anisotropically magnetized film, a second anisotropically magnetized film, a control channel formed as a low coercive force channel within said first film, a signal channel formed as a low coercive force channel within said second film, said first and said second film being positioned adjacent to one another in overlapping relationship with a portion of said control channel overlapping a portion of said signal channel whereby the magnetic field from a domain of reversed magnetization within said control channel affects the state of magnetization within said signal channel; and means for applying a magnetizing field to said films to propagate domains of reversed magnetization along said channels.

2. A magnetic logic element in accordance with claim 1 wherein said control channel has a substantially wider dimension than said signal channel in the area of overlap between said control and said signal channel.

3. A magnetic logic element in accordance with claim 1 wherein said control channel has a bifurcated portion and wherein said films are positioned such that said signal channel lies between and vertically displaced from said bifurcated portions of said control channel.

4. A magnetic logic element in accordance with claim 1 wherein said control channel terminates in the vicinity of said signal channel and overlaps said signal channel such that when a magnetizing field is applied to said film by said means for applying a magnetizing field and a domain of reversed magnetization is propagated in said control channel, a domain of reversed magnetization is formed within said signal channel.

5. A magnetic logic element in accordance with claim 1 wherein said control channel is formed such that a domain of reversed magnetization within it inhibits the propagation of a domain of reversed magnetization along said signal channel.

6. A magnetic logic element in accordance with claim 5 wherein said means for applying a magnetizing field applies a magnetizing field sufficient to propagate a domain of reversed magnetization along said signal channel when there is no domain of reversed magnetization within said control channel, said field being of insufficient intensity to propagate a domain of reversed magnetization along said signal channel when there is a domain of reversed magnetization within said control channel.

7. A magnetic logic element in accordance with claim 5 wherein said control channel terminates in the vicinity of said signal channel and a portion of said control channel directly overlies said signal channel, the portion of said control channel overlying said signal channel being formed in a generally rectangular shape with the long axis of said rectangle parallel to the long axis of said channel, said rectangle having V shaped indentations on the edges of said rectangle transverse the long axis of said channel.

8. A magnetic logic element in accordance with claim 7 wherein said signal channel has width in the area of interaction of said control channel of approximately 1 mil and wherein said control channel rectangular portion has a short axis dimension of approximately 7 mils and a long axis dimension of approximately 10 mils.

9. A magnetic logic element in accordance with claim 1 wherein said magnetized film is a film substantially 1,500 A. thick, formed of a composition of cobalt, iron and nickel.

References Cited

Spain, R. J., Domain Tip Propagation Logic, I.E.E.E. Transactions on Magnetics. Mag. 2 (3): pp. 347–351, September 1966.

BERNARD KONICK, Primary Examiner

G. M. HOFFMAN, Assistant Examiner

UNITED STATES PATENT OFFICE

CERTIFICATE OF CORRECTION

Patent No. 3,461,442 August 12, 1969

Robert J. Spain et al.

It is certified that error appears in the above identified patent and that said Letters Patent are hereby corrected as shown below:

Column 3, line 57, that portion of the formula reading $Hi = \frac{H_i - H_t}{2}$ should read $H_i = \frac{H_k - H_t}{2}$ Signed and sealed this 28th day of April 1970.

(SEAL)
Attest:

Edward M. Fletcher, Jr.
Attesting Officer

WILLIAM E. SCHUYLER, JR.
Commissioner of Patents